United States Patent
Marsh

[11] 3,892,398
[45] July 1, 1975

[54] COMPRESSION SPRING

[75] Inventor: Gerald Leonard Marsh, Indianapolis, Ind.

[73] Assignee: The Firestone Tire & Rubber Company, Akron, Ohio

[22] Filed: Feb. 1, 1974

[21] Appl. No.: 438,804

Related U.S. Application Data

[62] Division of Ser. No. 262,819, June 14, 1972, abandoned.

[52] U.S. Cl. ............................ 267/153; 267/63 R
[51] Int. Cl.² ........................................ F16F 1/36
[58] Field of Search ............... 267/153, 63 R, 65 B

[56] References Cited
UNITED STATES PATENTS

| | | | |
|---|---|---|---|
| 3,038,717 | 6/1962 | Bank | 267/65 B |
| 3,412,990 | 11/1968 | Gladstone | 267/153 |
| 3,625,501 | 12/1971 | Hein | 267/153 |
| 3,630,252 | 4/1962 | Edgerly et al. | 267/65 B |
| 3,666,290 | 5/1972 | Dalton et al. | 267/153 |

*Primary Examiner*—James B. Marbert

[57] ABSTRACT

An elongate elastomeric vehicle compression spring having a curved body-exterior and incorporating parallel reinforcing cords, and having a surface enbracing a diminishing cross-sectional area extending axially from the end of the body. The surface is in the shape of a truncated cone or curved, extending axially away from the end of the body, or into the body, and it may be located at one end or at both ends of the spring. The cross-section of the spring thus presents increasing amounts of rubber, as well as increasing resistance, to an increasing load.

5 Claims, 13 Drawing Figures

COMPRESSION SPRING

This is a division of application Ser. No. 262,819, filed June 14, 1972 now abandoned.

BACKGROUND OF THE INVENTION

Compression springs in vehicle suspensions pose problems in connection with controlling the spring rate, or "hardness", as reflected by the load-deflection curve. A high spring rate is identified with stiffness of the suspension, being the relationship of a particular load and the static deflection caused by it, as exemplified by the tangent to the deflection curve at that particular load. A high spring rate figure therefore denotes a steep tangent, a steep deflection curve, and a "hard" spring; conversely, a low spring rate denotes a "soft" spring, i.e., a greater deflection.

The softness of a suspension is commonly measured by static deflection or by natural frequency. The natural frequency of a system varies as an inverse function of the static deflection: the greater the static deflection, the lower the natural frequency, and the softer the system.

With a constant rate spring, such as a metal coil spring, the softness of the suspension system increases as the load increases; this produces problems, particularly where a large weight-difference exists between the empty vehicle and the fully loaded vehicle: the spring must be designed to carry a maximum load, but this results in a "hard" spring and a harsh ride at light loads.

Additionally, with a coil spring, in order to obtain lower spring rate and higher deflection, its length must be increased substantially, resulting in a laterally unstable and impractical structure. An increase in length in previously known elastomeric springs would be faced with the same limiting factors.

It is known to provide elastomeric springs with separate encircling metal bands to control outward bulging under load, as for example shown in U.S. Pat. No. 3,081,993 to L. Wallerstein, Jr.; such a device is in effect a rubber spring within a steel spring and is not considered capable of closely controlling the deflection curve.

It has been suggested to utilize springs having a substantially cylindrical core of elastomer formed integrally along its entire axial length with reinforcing woven or knit fabric material; such devices, however, provide only limited control of characteristics and suffer early failure under flexing stresses through separation of the reinforcing material from the core.

SUMMARY OF THE INVENTION

A variable rate rubber spring can be designed which will provide substantially the same ride under all load conditions, while having the lateral stability necessary to achieve the height which will provide a high static deflection.

Such a spring will be laterally stable though slender, and will have a closely controlled load-deflection curve, together with a natural frequency as low and as constant as desired, regardless of load, such as to provide a balance between a good ride at light loads and adequate carrying capacity at high loads, along with lateral stability at increased lengths.

The spring of the invention accordingly comprises a rubber body member with a curved exterior and incorporating rubberized fabric material whose cords extend at angles to the axis of the spring, and having a surface of diminishing area extending axially from the end of the body.

BRIEF DESCRIPTION OF THE DRAWINGS

FIG. 5 – 13 are sectional views of modifications of the spring of the invention.

DESCRIPTION OF PREFERRED EMBODIMENTS

Although numbered consecutively, such numbering is not determinative of relative utility of the embodiments.

I

Figure 1:
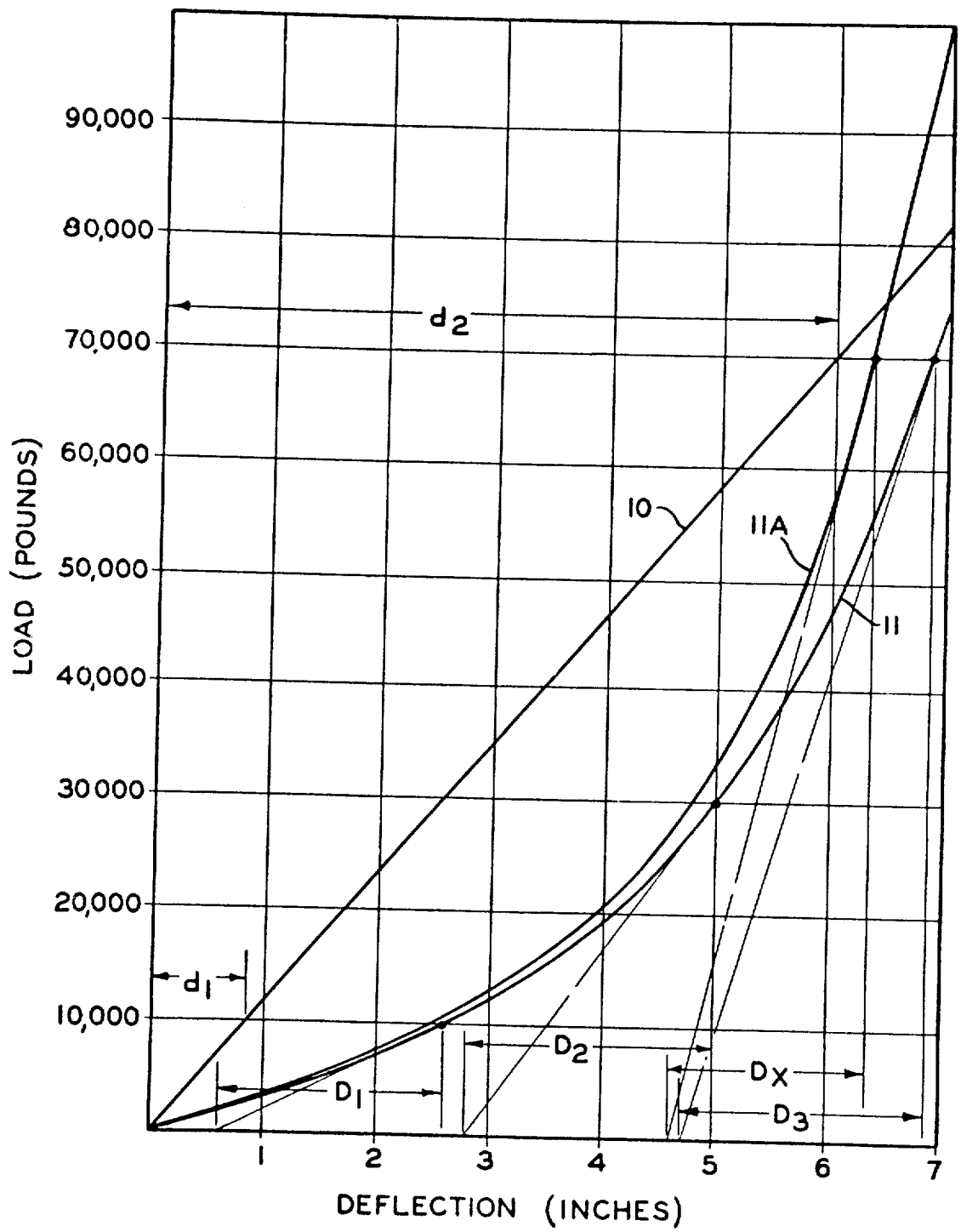
FIG. 1 shows a comparison of load-deflection curves.

In FIG. 1, the chart indicates inches of deflection along the horizontal scale, and load in pounds along the vertical scale.

With respect to the curves, the horizontal distance from the actual deflection to the intersection of the spring-rate tangent with the horizontal (Deflection) line represents the equivalent static deflection 'D' for a given load. The natural frequency at a particular load is defined by the formula $188/\sqrt{D}$.

At 10 is shown the typical curve for a conventional constant spring-rate steel spring. Its static deflection $d_1$ at 10,000 pounds is 0.85 inch, corresponding to a natural frequency of 204 cycles per minute; at 70,000 pounds, the static deflection $d_2$ is 6 inches, corresponding to a natural frequency of 77 cycles per minute.

The steel spring thus shows the wide variation in natural frequencies at light and heavy loads, which makes it undesirable; further, the spring rate is constant at about 11,600 pounds per inch, calculated by dividing the load by the static deflection; this rate is too high at the light-load condition, and too low at the high-load condition.

The spring of the invention satisfies the requirements of a suspension which is relatively soft and has a large deflection at low loads, but which rapidly increases its support of higher loads without excessive deflection; a curve which is characteristic of the spring of the invention is shown at 11 in FIG. 1.

At 10,000 pounds, a spring typical of the invention has a static deflection $D_1$ of 2.0 inches, and thus a spring rate of about 5,000 pounds per inch. The natural frequency at this load is 133 cycles per minute. At 30,000 pounds load, the deflection $D_2$ is 2.2 inches, and the spring rate is 13,600, with a natural frequency of 127 cycles per minute. At 70,000 pounds load, the same spring has a static deflection $D_3$ of 2.2 inches, corresponding to a spring rate of about 31,800 pounds per inch, and a natural frequency of 127 cycles per minute. It will be seen that the spring of the invention exhibits a desirable, substantially constant natural frequency regardless of the load.

Curve 11A represents the load-deflection curve of a spring designed for a more rigid condition under load. The equivalent static deflection at 10,000 pounds is essentially the same as for curve 11, giving the same soft ride at low loads; but the equivalent static deflection $D_r$ at 70,000 pounds is only 1.7 inches. This corresponds to a natural frequency at 144 cycles per minute, thus giving a more 'rigid' suspension system which provides greater stability for equipment that may require it when loaded.

Figure 2:
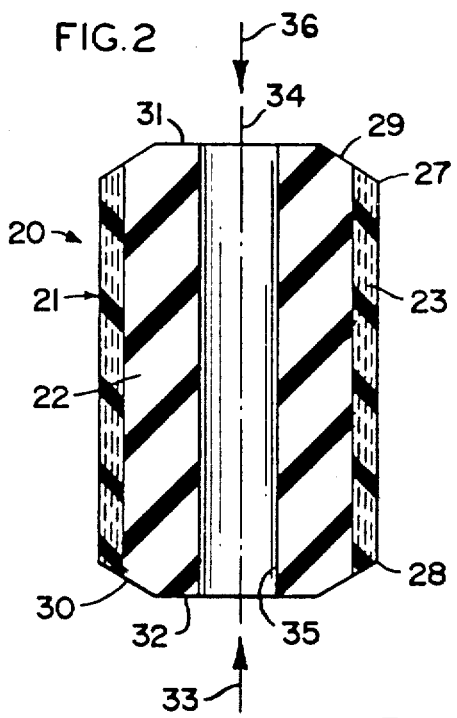
FIGS. 2, 4 and 5 are cross-sectional views of one preferred form of spring of the invention, shown at different stages of compression.
Figure 3:
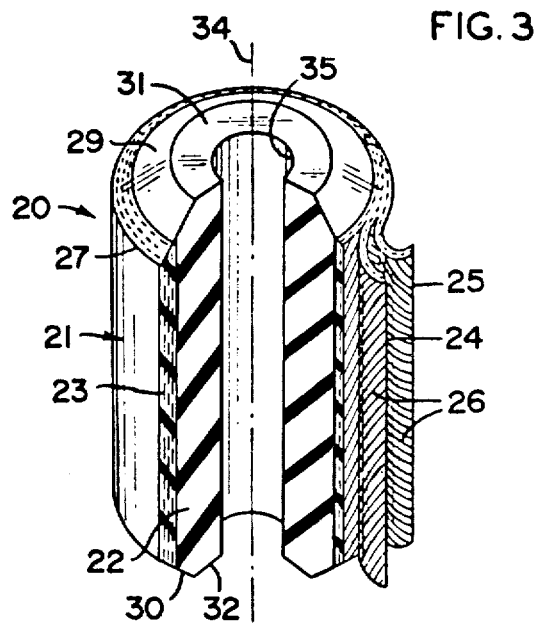
FIG. 3 is a perspective view, partly in section and broken away, of the spring of FIG. 2.

The inventive device whose curve has been described above is shown in unloaded, or uncompressed, condition in FIGS. 2 and 3. The spring 20 comprises a hollow, substantially cylindrical body 21 having an inner zone, or core, 22 of elastomeric material; and an outer zone, or sheath, 23 of fabric-reinforced elastomer. As seen in FIG. 3, the zone 23 comprises layers, such as 24 and 25 of elastomer-coated cords 26, which are parallel to each other within a particular layer. The cords 26 are biased, i.e., they extend at angles to the body-axis 34, the angles in adjacent layers such as 24 and 25 shown as being equal, but extending in opposite directions.

Frustro-conical surfaces 29, 30 extend axially from the ends 27 and 28 of the body 21, with diminishing diameters.

The spring 20 terminates in faces 31 and 32 which are adapted to be acted upon by compressive forces indicated by arrows 33, 36.

When the spring is loaded in the direction of its axis 34, the reaction is a tendency to flatten the inclined surfaces 29 and 30, and to expand the body 21 radially. The restraining radial force exerted on the inner zone 22 by the biased cords 26 of zone 23 is minimal during this initial axial deflection of the spring. As the load increases, however, and the spring is further deflected, the tapered end surfaces 29, 30 tend to flatten out, offering greater resistance; at the same time, with radial outward expansion of the body, the bias-angle of the cords 26 increases, offering greater resistance to deflection.

Figure 4:
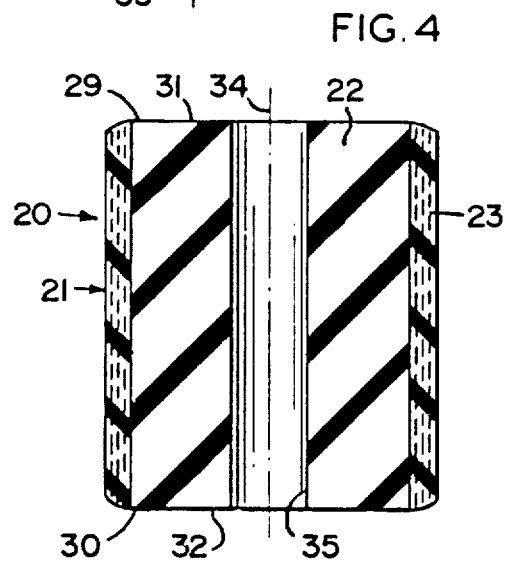

The condition at this increased load is shown in FIG. 4, the inclined surfaces 29, 30 now being substantially flattened, the spring shortened and its diameter increased.

Figure 5:
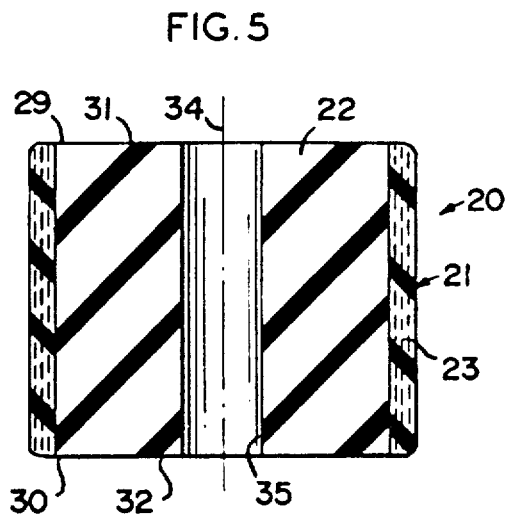

Further diameter increase and shortening of spring length result from still greater load; as the spring is expanded radially, the displacement of the elastomer is controlled by the cords so that it retains an essentially cylindrical shape, as seen in FIG. 5. This prevents the elastomer from being displaced laterally and allows springs to be built with slenderness--(i.e., length-to-diameter) ratios of more than 2 to 1.

Further controls on spring characteristics are available by changing the size and shape of the hole 35 in the core of the spring or by eliminating it altogether. The larger the hole, the greater the bulge area available, and therefore the softer the spring. Tapering the hole will likewise affect the spring characteristics, as would the provision of a hole especially shaped, such as for example in the form of a star, shown at 111 in FIG. 13.

The load-deflection curve 11 of FIG. 1 shows characteristics of an actual spring 20 constructed according to FIGS. 2 and 3; its unloaded axial length was 22 inches and its outside diameter 13 inches. Zone 22 was of 70 durometer hardness rubber; the surfaces 29, 30 were inclined at an angle of 28° to the radial plane of the spring and extended axially ½ inch beyond the body-ends 27, 28. The cords 26 of zone 23 extended at angles of about 60° to the spring-axis 34, in alternating directions.

The condition of FIG. 4 exists at approximately 12,000 pounds load, and FIG. 5 shows the condition at approximately 73,000 pounds load.

II

Figure 6:
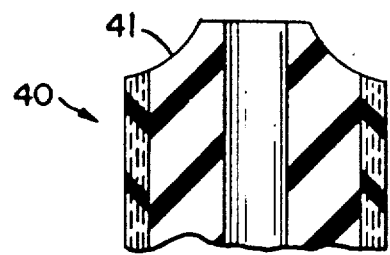

FIG. 6 shows a spring 40 having a diminishing-diameter surface 41 which is flared, rather than being frustroconical.

III

Figure 7:
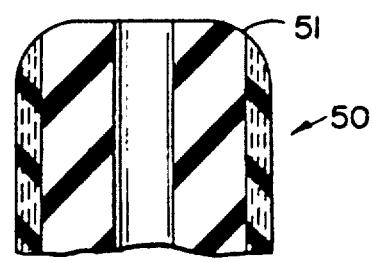

In FIG. 7, the spring 50 has a surface 51 which curves oppositely from that shown in FIG. 6.

IV

Figure 8:
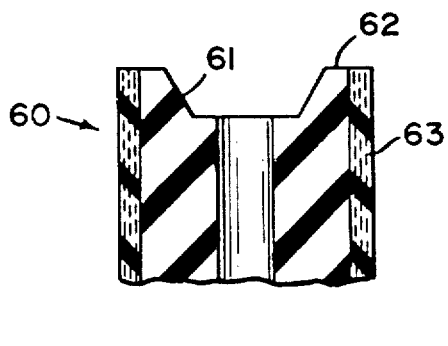

FIG. 8 shows a spring 60, whose diminishing diameter surface 61 extends axially inwardly from the end 62 of the spring body 63.

V

Figure 9:
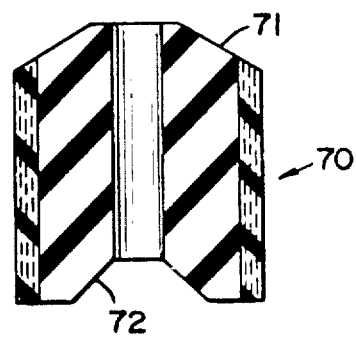

FIG. 9 shows a spring 70 which utilizes an axially outwardly extending surface 71 at one end, and an axially inwardly extending surface 72 at the opposite end.

VI

Figure 10:
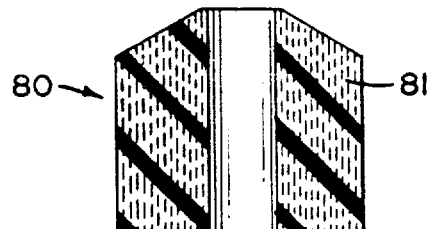

In FIG. 10 is shown a spring 80 in which the reinforcing zone 81 has been extended radially inwardly to its maximum.

VII

Figure 11:
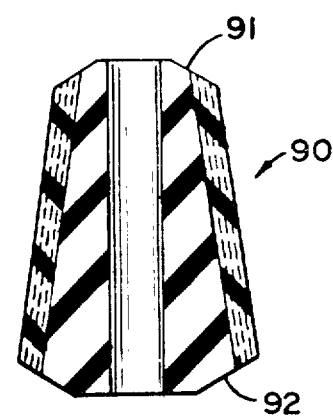

FIG. 11 shows a spring 90 which is cone-shaped with sloping end-surfaces 91 and 92.

VIII

Figure 12:
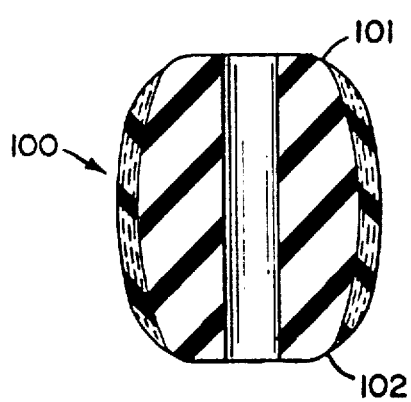

FIG. 12 shows a barrel-shaped spring 100 with end surfaces 101 and 102.

IX

Figure 13:
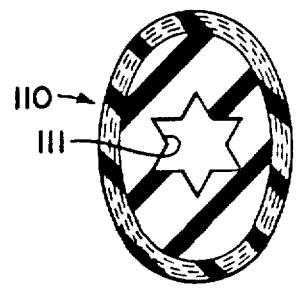

FIG. 13 shows a spring 110 having an oval cross-section, and a star-shaped opening 111.

This invention provides a spring whose performance may be controlled by the proper relationship of several factors. For example, the type, gauge and bias angle of the cord-reinforcement, as well as the number of layers thereof, may be varied to produce springs of greater or lesser stiffness, particularly in the higher load area.

The fabric-reinforcement also makes it possible to work with high axial-length/diameter ratios, resulting in slenderness without buckling. Ratios of greater than 2:1 and 3:1 are easily obtainable. As a result, systems having natural frequencies of less than one cycle per second can be produced.

For certain applications, the reinforcing cord fabric, rather than comprising alternating layers with cords at opposed angles, may be wrapped several times in the same direction, and balanced by other wraps in the opposite direction. The reinforcement may also utilize angle-relationships which are opposite, but not necessarily of the same angularity; or indeed, the angles of the cords may extend entirely in a single direction, as by wrapping continuously.

The main body shape may be substantially cylindrical, as in FIGS. 1–10; frustro-conical, as in FIG. 11; barrel-shaped, as in FIG. 12; or oval, as in FIG. 13.

A change in the overall length of the spring also changes its characteristics; for example, a shortening tends to stiffen the spring.

In order to produce a spring which is softer at the low-load end of the curve, the axial extent of the diminishing diameter surfaces may be increased; furthermore, a change in the shape of that surface changes the rate at which the low end of the curve rises.

It will be understood that the spring may have two shaped ends; or only a single shaped end, if required by a particular application.

What is claimed is:

1. A compression spring comprising a hollow body of elastomeric material having a height to width ratio of approximately two to one in unstressed condition, said body having a substantially cylindrical configuration throughout the major portion of its height, and having at at least one end a shaped portion of diminishing cross-section and having an outer surface inclined at an angle to the major axis of said body, reinforcing means extending axially of said body at least coextensive in height with the height of said cylindrical configuration and comprising at least two layers of elastomer coated cords integrally bonded layer to layer and to said body, the cords of each layer being parallel to one another and extending at an angle to the major axis of said body with the angular relationship of the cords of one layer being opposite to that of the cords in the other layer whereby in response to compressive force exerted in a direction parallel to the major axis of said body, the elastomeric material of said shaped portion takes up the initial compressive force as the height of said body is decreased and said reinforcing means having such a bonded relationship with said body as to resist radial expansion to such an extent that the major portion of said body retains its substantially cylindrical configuration up to loads of at least 70,000 pounds.

2. The compression spring as claimed in claim 1 and said outer surface of said shaped portion being frusto-conical.

3. The compression spring as claimed in claim 1 and said body having shaped portions at its opposite ends, said shaped portions extending axially beyond said reinforcing means and said outer surfaces of said shaped portions being frusto-conical.

4. The spring of claim 1, wherein said surface is flared.

5. The spring of claim 1, wherein said surface extends axially inwardly of said reinforcing means.

* * * * *